Nov. 15, 1932.  R. R. MARRIOTT  1,887,770
AUTOMATIC CHICKEN FEEDER AND LIGHT CONTROL MECHANISM
Filed Jan. 22, 1930
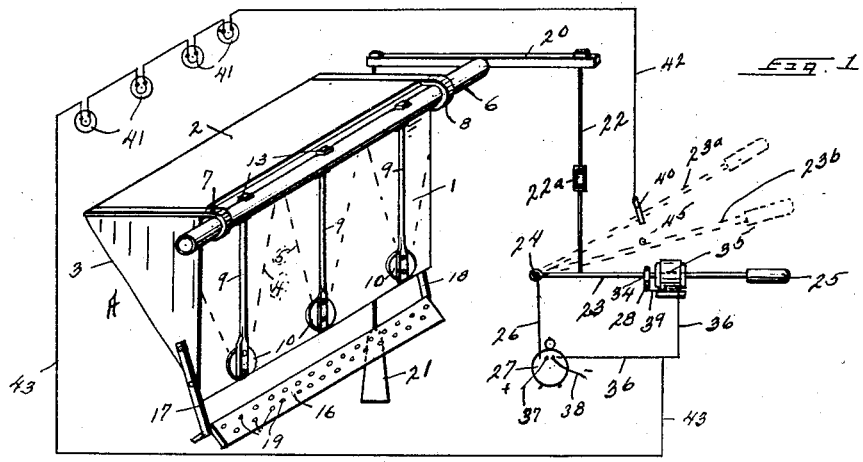
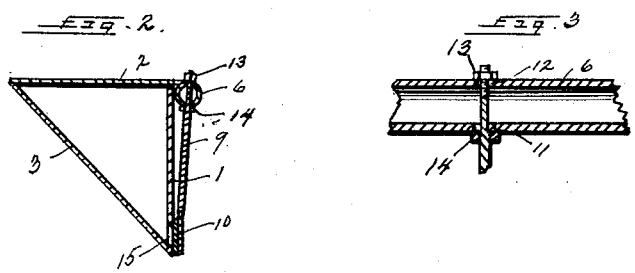
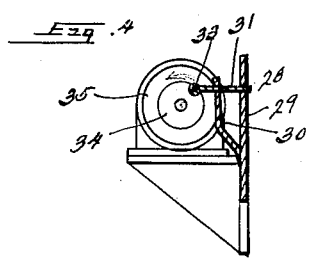
Inventor
Roscoe R. Marriott
By R. M. Thomas
Attorney Patented Nov. 15, 1932

1,887,770

UNITED STATES PATENT OFFICE

ROSCOE R. MARRIOTT, OF BINGHAM, UTAH

AUTOMATIC CHICKEN FEEDER AND LIGHT CONTROL MECHANISM

Application filed January 22, 1930. Serial No. 422,596.

My invention relates to automatic feeding of animals and has for its object to provide a new and efficient means of automatically opening feed containing hoppers at a predetermined hour and at the same time controlling the electric current to turn on the lights in the feeding pens.

A further object is to provide an automatic feeding and light control mechanism for controlling the feeding of chickens and for turning on the lights in the chicken coops early in the morning before daylight, to induce the chickens to feed earlier and to lay better.

A still further object is to provide a means on the bottom of the feeder to spread the feed to force the chickens to scratch more for the feed thereby giving them better exercise.

A still further object is to provide means for controlling the feeding of the chickens, which means may also be set to turn on the lights in the coop or set to prevent the lights from being turned on when not desired. If it is desired to feed the chickens early in the morning and at that time the lights would also be wanted, but sometimes the chicken raiser must be away in the afternoon and until evening, and he has to feed the chickens but does not need to turn on the lights, so the device may be set to feed the chickens but not turn on the lights.

These objects I accomplish with the device illustrated in the accompanying drawing in which similar numerals and letters of reference indicate like parts throughout the several views and as described in the specification forming a part of this application and pointed out in the appended claims.

In the drawing in which I have shown the best and most preferred manner of building my invention Figure 1 is a perspective view of the device with the lighting means and the control therefor shown diagrammatically. Figure 2 is a section vertically through the feed hopper and one of the control arms for controlling the outlet therefrom. Figure 3 is a section of the longitudinal support bar, parts shown out of proportion. Figure 4 is a section of the control switch and the motor which operates it.

In the drawing I have shown the feed hopper as A, being formed with one flat vertical face 1, a horizontal top or cover 2, and an angled back 3, with partitions 4 and 5 shown in dotted lines. The partitions 4 and 5 are to divide the interior of the hopper into feed chambers holding a certain amount of feed and the partitions are set into the hopper in such a position as to slope to the outlet port 15, thereby providing means to completely empty the hoppers at each feeding, if desired. On the front side of the hopper I then mount a longitudinal control bar or pipe 6 which pipe is mounted in suitable bearings 7 and 8, said bearings being mounted to the hopper. Depending from said pipe 6, I then provide control arms 9, which arms are made of a bar having a closure valve or plate 10 secured on the lower end thereof to control the port 15 in the hopper and having the top end with a portion made of smaller diameter than the rest of the bar. The top end of the bar or arm is passed through the pipe 6 through holes 11 and 12. The hole 11 is of larger diameter than the hole 12 and is the hole through the lower side of the pipe through which the larger portion of the bar is passed and the hole 12 is the hole through the top of the pipe through which the smaller portion of the bar is passed. This varying of the size of the end of the arm or bar and the size of the holes is to provide for adjustment of the position of the bar or arms 9 so that the control plate 10 may be adjusted to completely cover the port 15 in the bottom of the hopper. A nut 13 is screwed onto the top end of the bar and a nut 14 is screwed onto the lower portion of the bar and the two nuts may be tightened toward each other on the pipe to hold the arms secured to the pipe.

Spaced below the lower end of the hopper and directly under the flow of the outlet I mount an angled spreader member 16 which spreader member is supported from the ends of the hopper by bars 17 and 18 and which spreader member is provided with holes 19 therethrough through which a portion of the grain may pass and with the angled top of the spreader adapted to divert the flow of grain from the hopper and cause it to be spread over the floor surface of the chicken run or coop.

Secured on one end of the pipe 6 I provide a control lever 20 which lever has a weight 21 secured by a cable depending from one end thereof and an adjustable control bar 22 is secured to the other end thereof. The adjustable bar 22 is provided with a turn buckle 22a therein to lengthen or shorten the length of the bar 22 as necessary to provide the correct tension of the valve plates 10 over the ports 15. The lower end of the bar 22 is secured to a switch lever 23, which switch lever 23 is pivoted at one end by a pin 24 and has a handle 25 on the free end thereof. One end of the switch lever is connected by a wire 26 with an electric time control mechanism 27 and the lever is the means of carrying current to a switch member 28. The switch member 28 is formed with a back side 29, and an angled contact bar 30, secured thereto, spaced from the back sufficient distance to allow the lever 23 to be engaged therebetween. A control pin 31 is then passed through holes in the bar 30 and the back side 29 to hold the lever 23 in place in the switch as necessary but when the pin is pulled the lever may be withdrawn therefrom. The said control pin 31 is formed with one end perforated to receive a crank pin 33 which pin 33 is secured to a plate 34 on the drive shaft of a motor 35. A wire 36 connects the motor 35 with the time control mechanism 27 and lead wire 39 connects the motor with the switch 28, and lead wires 37 and 38 carry current to the control mechanism so that when the mechanism is operated the current will pass therethrough carrying current over the wire 26, through the lever 23, through the switch 28 to the motor, through the wire 39, and from the motor over the wire 36 to the mechanism thereby completing the circuit and operating the motor, which withdraws the pin 31 releasing the lever 23 from the switch 28 breaking the current.

Directly above the lever 23 but spaced therefrom I provide another switch 40 which switch 40 is connected with the lights 41 of the chicken coop by a wire 42 and a wire 43 connects the lights with the wire 36 of the time control mechanism, forming a circuit and when the lever 23 is released from the switch 28 by the action of the motor 35 it is pulled upwardly by the bar 22, the bar 20 and the weight 21 until it is engaged with the switch 40 carrying the current through the wire 36 and the lever into the switch 40 completing the contact and lighting the lights of the coop.

When the lever 23 is released the weight 21 will draw it upward and at the same time will partially rotate the pipe 6 which action will move the arms 9 and the plates 10 away from the ports 15 of the hopper allowing the feed to flow therefrom, thereby completing the operation of the device.

When it is desired to feed the chickens without lighting the lights a pin 45 is passed into a hole in the side of the wall above the lever 23 and when the lever is actuated or released it is stopped by the pin 45 before coming into contact with the switch 40 thereby opening the plates 10 from the ports 15 but not completing the circuit through the lights.

The position of the lever 23 when operating the lights is indicated by dotted lines 23a and when feeding without the lights, by the dotted lines 23b.

Treads may be formed on the end of the pipe 6 to couple the pipe with extensions so that more hoppers may be controlled by the one line.

It will be obvious that other methods may be used to control additional hoppers without departing from the spirit of the invention or the scope of the claims.

Having thus described my invention I desire to secure by Letters Patent and claim:—

1. In a device of the class described the combination of a hopper; outlet ports in the front of said hopper; a horizontal pipe mounted adjacent thereto; a weight controlled lever carried on the end of said pipe; a switch lever connected with said weight lever by an adjustable rod; a switch mounted adjacent a motor, said switch adapted to receive said switch lever between the ends thereof; a motor to control said switch; a pin controlled by said motor, said pin to be withdrawn from said switch to release the switch lever therefrom, when the motor is actuated; a time mechanism to introduce electric current into said motor at a predetermined period of time; another switch to engage said switch lever when it has been released from said first mentioned switch by the action of said motor; a series of lights connected with said last mentioned switch and with said time control mechanism so that when the switch lever is released from the first mentioned switch and comes into contact with the second mentioned switch the lights are turned on; arms on said horizontal pipe; closure plates on the end of said arms to control the outlet ports from said hopper; a pin to stop the switch lever from engaging with the second mentioned switch when desired; and a perforated spreader mounted under said hopper to distribute the feed over the floor.

2. In a device for feeding chickens the combination of a hopper having sloping partitions therein to direct the feed to outlet ports in the front side thereof; a spreader mounted under said outlet ports; a control pipe mounted adjacent said hopper; adjustable depending arms therethrough; means on the ends of said arms to close said outlet ports as desired; and means to electrically control the opening of said ports at a predetermined period of time.

3. In a device for feeding chickens the combination of a hopper having sloping partitions therein to direct the feed to outlet ports in the front side thereof; a perforated angled spreader mounted under said outlet ports; a control pipe mounted adjacent said hopper; depending adjustable arms secured through said pipe; closure plates on the end of said arms to close said outlet ports; and lever arms by which said pipe is actuated.

In testimony whereof he has affixed his signature.

ROSCOE R. MARRIOTT.